United States Patent [19]

Bertram et al.

[11] Patent Number: 5,121,020
[45] Date of Patent: Jun. 9, 1992

[54] ROTOR FOR AN ELECTRIC MOTOR

[75] Inventors: Leo Bertram, Stolberg, Fed. Rep. of Germany; Hugo Schemmann, Schaesberg, Netherlands; Romuald L. Bukoschek, Klagenfurt, Austria

[73] Assignee: U.S. Philips Corp., New York, N.Y.

[21] Appl. No.: 317,412

[22] Filed: Mar. 1, 1989

[30] Foreign Application Priority Data

Mar. 10, 1988 [DE] Fed. Rep. of Germany ....... 3807810

[51] Int. Cl.$^5$ .................. H02K 21/14; H02K 1/04; H02K 1/28
[52] U.S. Cl. ................. 310/156; 310/43; 310/40 MM
[58] Field of Search ............ 310/40 MM, 43, 45, 156, 310/261, 265

[56] References Cited

U.S. PATENT DOCUMENTS 4,587,450 5/1986 Ozaki ..................... 310/43

FOREIGN PATENT DOCUMENTS 55-2313 1/1980 Japan ..................... 310/156

Primary Examiner—Steven L. Stephan
Assistant Examiner—C. LaBalle
Attorney, Agent, or Firm—Lesley A. Rhyne

[57] ABSTRACT

The invention relates to a rotor (10) for an electric motor, in particular for a multi-phase or single-phase electric motor, comprising a permanent-magnetic ceramic rotor cylinder (1) made of an imperforate solid material and provided with moulded-on plastic elements (5) on at least the cylinder end faces (3), which elements carry axially projecting shaft portions (6) for rotatably journalling the rotor (10), the cylinder end faces (3) being formed with recesses and the moulded-on plastic elements (5) engaging in the recesses (4).

3 Claims, 1 Drawing Sheet

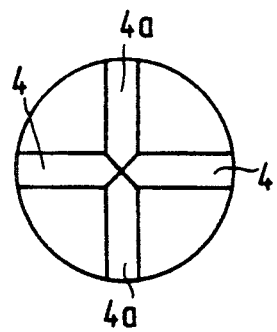
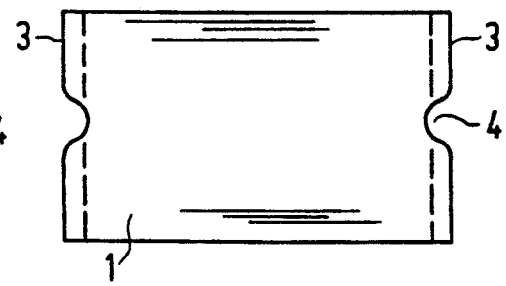
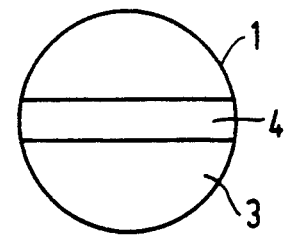
FIG.2b    FIG.1    FIG.2a
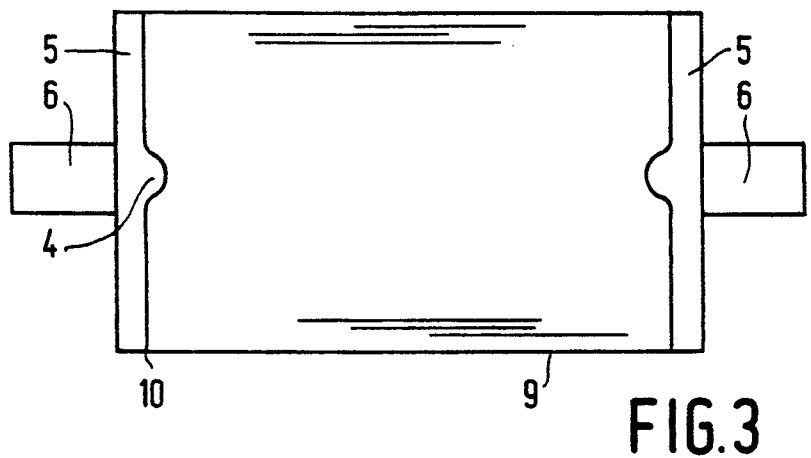
FIG.3
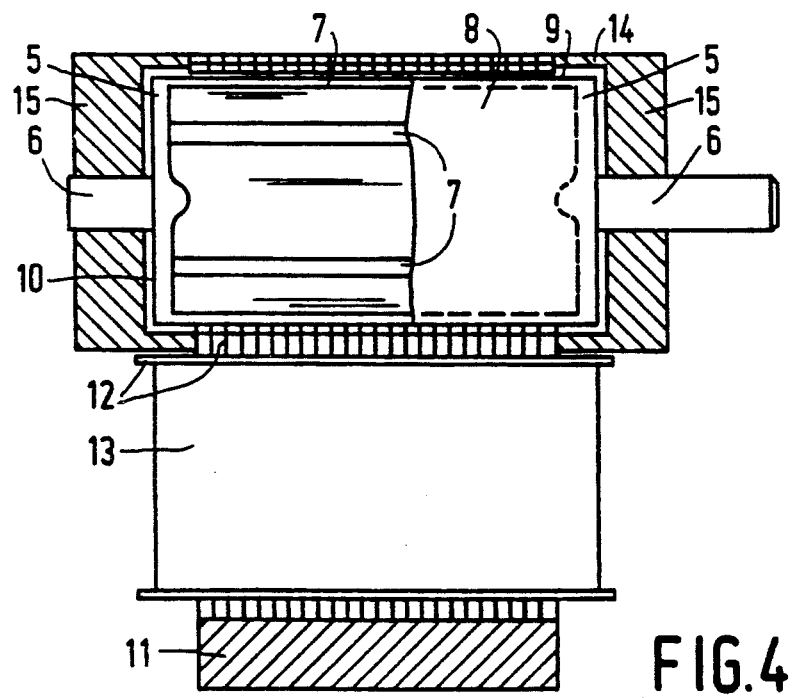
FIG.4

ROTOR FOR AN ELECTRIC MOTOR

BACKGROUND OF THE INVENTION

The invention relates to a rotor for an electric motor, in particular for a multi-phase or single-phase electric motor, comprising a permanent-magnetic ceramic rotor cylinder made of an imperforate solid material and provided with moulded-on plastic elements on at least the cylinder end faces, which elements carry axially projecting shaft portions for rotatably journalling the rotor.

Such a rotor is known from U.S. Pat. No. 4,587,450. The two moulded-on plastic elements of this rotor are interconnected externally of the rotor cylinder.

Ceramic rotor materials are subject to substantial firing shrinkage, which can give rise to cracking. Particularly in the case of high-grade ceramic magnet materials shrinkage and cracking effects lead to defects and rejects.

U.S. Pat. No. 4,587,450 describes rotor cross-sections varying between round and angulate. An angulate ceramic rotor poses production-engineering problems; it requires a series of expensive grinding operations. The well-known round cylindrical ceramic rotor can be manufactured more economically but in the case of higher motor-power ratings the moulded-on plastic elements cannot be connected firmly enough to withstand the torques to be transmitted. Torque transmission problems do not arise with the rotors described in DE 36 12 724 A1 and JP Patent Application 54-140 109, because these are designed only for low power ratings in clocks.

It is an object of the invention to provide a rotor of the type defined in the opening paragraph, which provides a torsion-proof connection between the rotor and moulded-on plastic elements, even for the transmission of larger torques.

SUMMARY OF THE INVENTION

A rotor according to the invention includes cylinder end faces are formed with recesses and moulded-on plastic elements engaging the recesses.

Since the moulded-on plastic elements engage the recesses in the cylinder end faces, an interlocked connection is obtained between the magnet material and the plastic, which is capable of transmitting large torques. Recesses in the end faces can be formed by giving the moulds for the manufacture of the magnet a suitable shape. The cylinder end faces require hardly any finishing because the tolerances on the final axial dimensions of the rotor during firing can be minimized. Some grinding to obtain the final dimensions affects the recesses in the end faces only slightly.

From Japanese Patent Application 58-95 967 it is known to provide a resin-bonded permanent-magnet rotor with axial grooves along its circumferential surface, which grooves are engaged by plastic parts connecting the plastic elements on the end faces.

Grooves along the circumferential surface of ceramic rotor-magnet bodies are critical. When the rotor is ground to obtain the correct dimensions of the circumferential surface the grooves will disappear as more grinding is necessary. The dimensional tolerances on the diameter of such rotors are very tight. In the case of high-grade anisotropic magnet materials more grinding is necessary. Axial grooves in the circumferential surface also have an undesirable chipping effect and lead to cracking.

These problems do not occur with the resin-bonded permanent-magnet bodies in accordance with Japanese Patent Application 58-95 967. These bodies can be moulded to size so accurately that no grinding is required. Resin-bonded permanent magnet bodies are not subject to cracking.

In a further embodiment of the invention the recesses are diametrally extending grooves. The diametrally located grooves have the special advantage that the direction of magnetization of the rotor cylinder can be externally visible and identifiable. This facilitates mounting of the rotor in a desired orientation of the magnetization relative to other drive or apparatus parts. This applies in particular to single-phase synchronous drives.

In a further embodiment of the invention the recesses are radially extending grooves. This enables a symmetrical distribution of the torque load on the connecting points to be achieved. The radial configuration may be star or cross-shaped.

Moulding the plastic caps onto the recessed cylinder end faces results in such a firm connection to the end faces of the rotor cylinder that the journals moulded in the plastic caps can withstand all the loads to be handled. In order to obtain an even more reliable construction it is preferred if the moulded-on plastic elements are interconnected at the axial ends of the rotor cylinder outside the rotor cylinder. Such connections may be, for example, connecting bridges.

BRIEF DESCRIPTION OF THE DRAWINGS

The invention will now be described in more detail with reference to the drawings. In the drawings:

FIG. 1 is a side view of a permanent-magnet rotor cylinder having end faces with grooves, FIGS. 2a and 2b show the rotor cylinder shown in FIG. 1 in two embodiments having different end faces; in FIG. 2a the grooves extend diametrally and in FIG. 2b the grooves extend radially in accordance with a cross or star-shaped configuration, FIG. 3 shows the rotor cylinder shown in FIG. 1 with moulded-on plastic caps and journals at the end faces, FIG. 4 shows the rotor shown in FIG. 3 in the stator of a single-phase synchronous motor, the plastic caps at the left-hand side being interconnected by bridges and at the right-hand side by a mould-around sleeve.

DETAILED DESCRIPTION OF INVENTION

FIG. 1 shows a rotor cylinder, which constitutes the principal part of a rotor of an electrical machine, in particular a multi-phase or single-phase synchronous motor. The rotor cylinder 1 is made of a ceramic permanent-magnet material which is fired after compression-moulding. The rotor cylinder has recesses 4 in its end faces 3. In the present exemplary embodiment, these recesses are grooves. In FIG. 2a a diametral groove is formed in each end face 3. Alternatively, a plurality of such grooves 4 may be formed parallel to each other. In FIG. 2b a plurality of radial grooves 4a form a star or cross. However, the recesses may alternatively be separate depressions distributed over the end faces.

FIG. 2 is a view at an end face 3 of the rotor cylinder 1, showing the diametral groove-like recess 4 in the end face. The rotor cylinder shown in FIGS. 1 and 2 is made of a solid material, i.e. the cylinder does not exhibit a through-going axial bore. The recesses 4 are formed only in the end faces 3.

The rotor cylinder shown in FIGS. 1 and 2 is completed to form a rotor in that the end faces 3 are provided with moulded-on plastic elements 5. The plastic material attaches to the cylinder end faces 3 and also fills the recesses 4, 4a during moulding. This stabilizes the connection between the moulded-on plastic elements 5 and the end faces 3.

The moulded-on plastic elements 5 are provided with journals 6, which project axially from the moulded-on elements. The rotor is rotatably supported by means of the journals 6. The journals 6 are also moulded from a plastic and may be externally or internally splined to to enable them to be coupled to drive shafts, not shown.

The grooves or recesses 4 serve not only to improve the torsional strength between the moulded-on plastics elements 5 and the end faces 3. When the grooves or recesses 4 are arranged diametrally as shown in FIG. 2a this has the additional advantage that the direction of magnetization of the rotor cylinder can be externally visible and identifiable. This facilitates mounting of the rotor 1 in a desired orientation of the magnetization relative to further drive or apparatus parts.

As is shown in the left-hand part of FIG. 4 the moulded-on plastics elements 5 are connected by bridges 7 which extend axially over the circumferential surface 9 of the rotor. In this way the ceramic rotor cylinder 1 is arranged in a cage and the moulded-on plastic elements 5 are held together. This gives the rotor 10 a higher mechanical stability.

The right-hand part of FIG. 4 shows that the rotor cylinder 1 is completely enclosed by a plastic encapsulation 8. This ensures a reliable containment of the rotor material.

FIG. 4 is a sectional view bisecting a stator 11 in which the rotor 10 is mounted. The stator 11 comprises a lamination assembly 12. An exciter coil 13 is slid onto the half of the lamination assembly 12 which is shown. The lamination assembly carries a housing 14 with end plates 15 in which the journals 6 are mounted for rotation.

We claim:

1. A rotor for an electric motor, in particular for a multi-phase or single-phase electric motor, comprising:
    a permanent-magnetic ceramic rotor cylinder made of an imperforate solid material and including first and second cylinder end faces, said end faces each having at least one recess formed therein;
    first and second moulded-on plastic elements on the first and second cylinder end faces, which elements engage said recesses and include axially projecting shaft portions for rotatably journalling the rotor; and
    wherein the recesses comprise diametrically extending grooves.

2. A rotor for an electric motor, in particular for a multi-phase or single-phase electric motor, comprising:
    a permanent-magnetic ceramic rotor cylinder made of an imperforate solid material and including first and second cylinder end faces, said end faces each having at least one recess formed therein;
    first and second moulded-on plastic elements on the first and second cylinder end faces, which elements engage said recesses and include axially projecting shaft portions for rotatably journalling the rotor; and
    wherein the recesses comprise radially extending grooves.

3. An electric motor comprising a rotor as claimed in any one of the claims 1 to 2.

* * * * *